United States Patent
Liccardi (10) Patent No.: US 9,423,004 B2
(45) Date of Patent: Aug. 23, 2016

(54) GEARBOX APPARATUS

(71) Applicant: Regal Beloit America, Inc., Beloit, WI (US)

(72) Inventor: Domenico Liccardi, Legnano (IT)

( * ) Notice: Subject to any disclaimer, the term of this patent is extended or adjusted under 35 U.S.C. 154(b) by 483 days.

(21) Appl. No.: 13/751,020

(22) Filed: Jan. 25, 2013

(65) Prior Publication Data

US 2014/0208879 A1    Jul. 31, 2014

(51) Int. Cl.
*F16H 1/20* (2006.01)
*F16H 57/033* (2012.01)

(52) U.S. Cl.
CPC .......... *F16H 1/20* (2013.01); *F16H 2057/0335* (2013.01); *Y10T 74/19219* (2015.01)

(58) Field of Classification Search
CPC ............... F16H 57/02; F16H 57/023; F16H 2057/02021; F16H 2057/0335
USPC ........................................ 74/325, 397, 421 A
See application file for complete search history.

(56) References Cited

U.S. PATENT DOCUMENTS

| | | | | |
|---|---|---|---|---|
| 2,436,746 | A * | 2/1948 | Drought | 74/325 |
| 2,926,542 | A * | 3/1960 | Schmitter et al. | 74/421 A |
| 3,011,358 | A * | 12/1961 | Moore | 74/409 |
| 3,073,176 | A * | 1/1963 | Daugirdas | 74/421 A |
| 4,133,216 | A * | 1/1979 | Gentile | F16H 57/023 74/384 |
| 4,802,372 | A * | 2/1989 | Harrod et al. | 74/325 |
| 5,095,767 | A * | 3/1992 | Spridco et al. | 74/397 |
| 6,513,401 | B2 * | 2/2003 | Bologna | 74/397 |

* cited by examiner

*Primary Examiner* — William C Joyce
(74) *Attorney, Agent, or Firm* — Armstrong Teasdale LLP (57) ABSTRACT

A gearbox housing defines a first enclosure for reception therein of at least two different diameter size first gearwheels. A second gearwheel has a second axis of rotation and is disposed at selected locations that permit intermeshing of the second gearwheel with one of the first gearwheels and a third gearwheel as well as a replacement first gearwheel and the third gearwheel.

14 Claims, 4 Drawing Sheets

GEARBOX APPARATUS

BACKGROUND OF THE INVENTION

1. Field of the Invention

The present invention relates to a gearbox apparatus.

More specifically, the present invention relates to a gearbox apparatus having at least three gearwheels disposed within a housing and in which one of the gearwheels is selectively replaced by a different gearwheel for generating a different gear ratio.

2. Background Information

Gearboxes enable the generation of a gear ratio between an input drive of the gearbox apparatus and a driven output thereof.

In the prior art, in a simple three gearwheel arrangement, the input drive is secured to the first gearwheel and the driven output is secured to the third gearwheel with the second gearwheel intermeshing with both the first and the third gearwheel. Such an arrangement generates a specific gear ratio between the input drive and the driven output.

However, it is often necessary to change a specific gear ratio and this change typically will require the replacement of the entire gearbox apparatus with a replacement gearbox having a first gearwheel that is larger or smaller in diameter than the original first gearwheel. The replacement gearbox consequently has a first gearwheel having a different number of gear teeth for generating a different gear ratio.

Consequently, the replacement gearbox must have a different size gearbox housing in order to accommodate the different diameter first gearwheel.

The provision of numerous size gearbox housings obviously increases the cost of production of such gearboxes.

Additionally, because the size of the first gearwheel has been changed and consequently the size of the gearbox housing has changed, it follows that the distance between the input drive and the driven output will change when the replacement gearbox is fitted thus adding to the expense of installing a replacement gearbox.

The present invention provides a unique gearbox apparatus which overcomes at least both of the aforementioned problems by the provision of a one size gearbox housing in which the housing defines a first enclosure for the selective reception therein of at least two different diameter size first gearwheels. Such an arrangement is made possible by having the axis of rotation of the second gearwheel disposed at selected locations with each location being the same radial distance from the axis of rotation of the third gearwheel. The selected locations permit intermeshing of the second gearwheel with both the first and the third gearwheel and the replacement first and the third gearwheel.

Therefore, it is a primary feature of the present invention to provide a gearbox apparatus that overcomes the problems associated with the prior art arrangements.

Another feature of the present invention is the provision of gearbox apparatus that greatly reduces the cost of the provision a several gearboxes having different gear ratios.

Another feature of the present invention is the provision of a gearbox apparatus that provides a replacement gearbox having a different gear ratio while maintaining the same distance between the drive input and the driven output.

Other features and advantages of the present invention will be readily apparent to those skilled in the art by a consideration of the detailed description of a preferred embodiment of the present invention contained herein.

SUMMARY OF THE INVENTION

The present invention relates to a gearbox apparatus. The apparatus includes a housing which has a first portion and a second portion disposed adjacent to the first portion.

A first assembly includes the first portion which defines a first enclosure and a second enclosure. A first gearwheel is rotatably disposed within the first enclosure about a first axis of rotation. The first gearwheel defines a plurality of gear teeth. A second gearwheel is rotatably disposed within the second enclosure about a second axis of rotation such that the plurality of gear teeth intermesh with the second gearwheel.

A second assembly is selectively interchangeable with the first assembly. The second assembly includes the first portion, a further first gearwheel rotatably disposed within the first enclosure about the first axis of rotation. The first enclosure is of sufficient capacity to selectively accommodate either of the first and further first gearwheels. The further first gearwheel defines a further plurality of gear teeth, the further plurality of gear teeth being different in number from the plurality of gear teeth of the first gearwheel. The second gearwheel is rotatably disposed within the second enclosure about a further second axis of rotation. The further second axis of rotation of the second gearwheel is spaced from the second axis of rotation of the second gearwheel. The arrangement is such that the further plurality of gear teeth of the further first gearwheel intermesh with the second gearwheel.

A third gearwheel is rotatably disposed within the second portion of the housing for rotation about a third axis of rotation. The first, second, further second and third axes of rotation are disposed spaced and parallel relative to each other so that the third gearwheel intermeshes with the second gearwheel for generating a first gear ratio between the first and third gearwheels. When the first assembly is selectively replaced by the second assembly, a second gear ratio is generated between the further first gearwheel and the third gearwheel.

In a more specific embodiment of the present invention, the housing is fabricated from metal.

Furthermore, the first portion is a casting and more specifically, the second portion together with the first portion is a one piece casting.

The first enclosure permits a selective reception therein of the first gearwheel and the further first gearwheel.

Also, the second gearwheel includes a support pin having a first and a second end. The pin registers with a first hole defined by the first portion of the housing when the pin is disposed in a first location in which the gearbox is in a first mode of operation for generating the first gear ration.

A bearing is disposed concentrically about the pin and a gear defines a cylindrical cavity for the reception therein of the bearing. The arrangement is such that the gear is bearingly supported by the pin for rotation of the gear about the second axis of rotation within the second enclosure.

Additionally, the pin is selectively movable so as to register with a second hole which is defined by the first portion of the housing when the gearbox is in a second mode of operation. In the second mode of operation, the gearbox apparatus generates the second gear ratio. The arrangement is such that the gear is bearingly supported by the pin for rotation thereof about the further second axis of rotation within the second enclosure. The second hole is spaced from the first hole such that the second axis of rotation is disposed at a first radial distance from the first axis of rotation so that the plurality of gear teeth of the first gearwheel intermesh with the gear of the second gearwheel when in the first mode of operation.

Furthermore, the arrangement is such that the further second axis of rotation is disposed at a second radial distance from the first axis of rotation so that the further plurality of gear teeth of the further first gearwheel intermesh with the gear of the second gearwheel when in the second mode of operation.

In a preferred embodiment of the present invention, the pin is of cylindrical configuration and the first hole is of cylindrical configuration for the removable reception therein of the first end of the pin.

A further first hole is defined by the first portion of the housing. The further first hole is aligned relative to the first hole for the removable reception therein of the second end of the pin. The arrangement is such that in the first mode of operation of the gearbox apparatus, the gear is rotatably supported by the pin for rotation thereof about the second axis of rotation, the gear and the bearing being disposed between the first hole and the further first hole.

Also, the second hole is of cylindrical configuration for the removable reception therein of the first end of the pin;

A further second hole is defined by the first portion of the housing. The further second hole is aligned relative to the second hole for the removable reception therein of the second end of the pin. The arrangement is such that, in the second mode of operation of the gearbox apparatus, the gear is rotatably supported by the pin for rotation thereof about the further second axis of rotation, the gear and the bearing being disposed between the second hole and the further second hole.

Moreover, the second axis of rotation and the further second axis of rotation are disposed at a same radial distance from the third axis of rotation such that the gear intermeshes with the third gearwheel when the gearbox apparatus is disposed in the first and second mode of operation thereof.

The housing defines additional holes with each additional hole being disposed at the same radial distance from the third axis of rotation.

Also, additional first gearwheels are provided with each additional first gearwheel having a different number of gear teeth for generating addition gear ratios when the pin is located in a corresponding hole of the additional holes.

Furthermore, the second portion of the housing includes a removable cover. The arrangement is such that when the removable cover is removed from the housing, access to the third gearwheel and to the pin is permitted so that movement of the pin between the first and second holes is permitted.

In one embodiment of the present invention, the first portion is releasably secured to the second portion.

Also, additional assemblies are provided in which each additional assembly includes an additional first portion, an additional first gearwheel and an additional second gear wheel. The arrangement is configured such that the additional assemblies are selectively secured to the second portion of the housing after removal therefrom of the first assembly. By this arrangement, additional gear ratios are provided by the combination of the second portion of the housing which includes the third gearwheel with one of the additional assemblies which have been preassembled ready for rapid generation of a different gear ratio.

Many modifications and variations of the present invention will be readily apparent to those skilled in the art by a consideration of the detailed description contained hereinafter taken in conjunction with the annexed drawings which show a preferred embodiment of the present invention.

However, such modifications and variations fall within the spirit and scope of the present invention as defined by the appended claims.

Included in such modifications would be the provision of a plate removably secured to the gearbox housing for rotatably supporting the second gearwheel and for enabling the rapid relocation to a corresponding selected location in order to mesh with a particular replacement first gearwheel.

Those skilled in the art will appreciate that the concept of the present invention could equally be applied to a gearbox having four or more intermeshing gearwheels.

The present invention also envisages an arrangement in which another plate or the same plate enables access to the first enclosure in order to facilitate removal of a first gearwheel and replacement thereof by a replacement further first gearwheel having a different number of gear teeth.

Additionally, the present invention includes an arrangement in which the gearbox housing may be a composite housing made up of a first portion and a second portion releasably secured to the first portion. In this case, several first portion assemblies are provided with each assembly providing a different gear ratio, so that the required assembly can rapidly replace an existing assembly in order to generate a different gear ratio as required. In this arrangement, it would only be necessary to disconnect the drive input and the fastening of the first portion of the housing. The first assembly could then be removed and replaced with a replacement assembly and the input drive could then be reconnected.

Those skilled in the art will appreciate that throughout the description of the specific embodiments of the present invention, the first portion of the housing is described as defining enclosures for the first and second gearwheels, the first gearwheel being secured to the drive input. However, the present invention also includes an arrangement in which the first portion of the housing could define enclosures for the reception therein of the second and third gearwheels with the third gearwheel being connected to the driven input.

BRIEF DESCRIPTION OF THE DRAWINGS

Similar reference characters refer to similar parts throughout the various views and embodiments of the drawings.

DETAILED DESCRIPTION OF THE DRAWINGS

Figure 1:
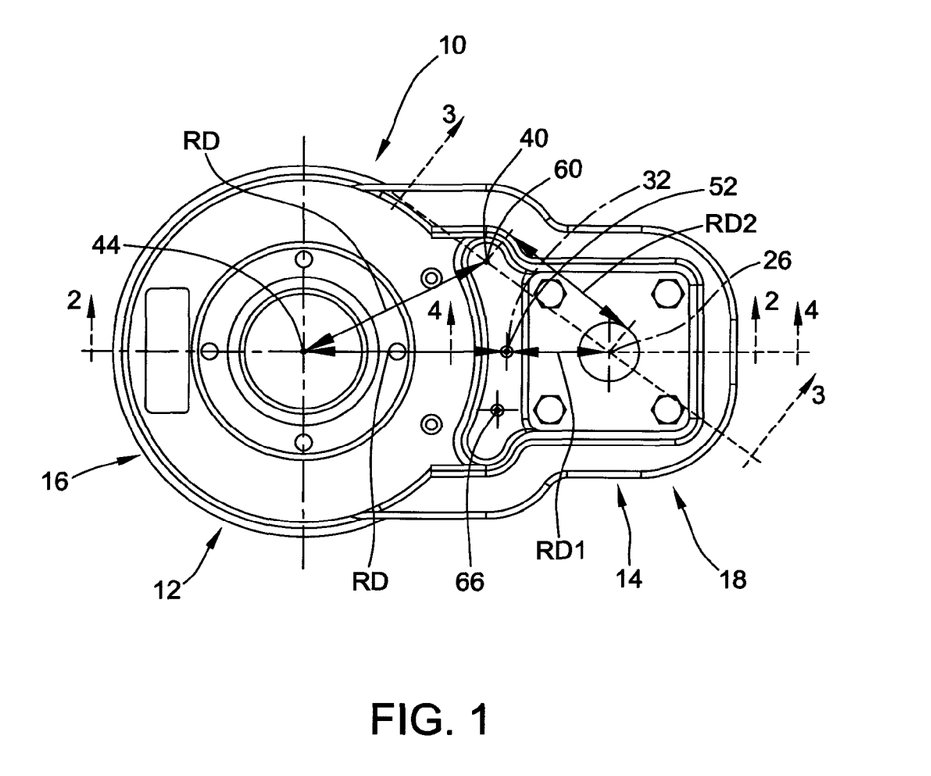
FIG. 1 is a top plan view of a gearbox apparatus according to the present invention.

FIG. 1 is a top plan view of a gearbox apparatus generally designated 10 according to the present invention. As shown in FIG. 1, the apparatus 10 includes a housing generally designated 12 which has a first portion 14 and a second portion 16 disposed adjacent to the first portion 14.

Figure 2:
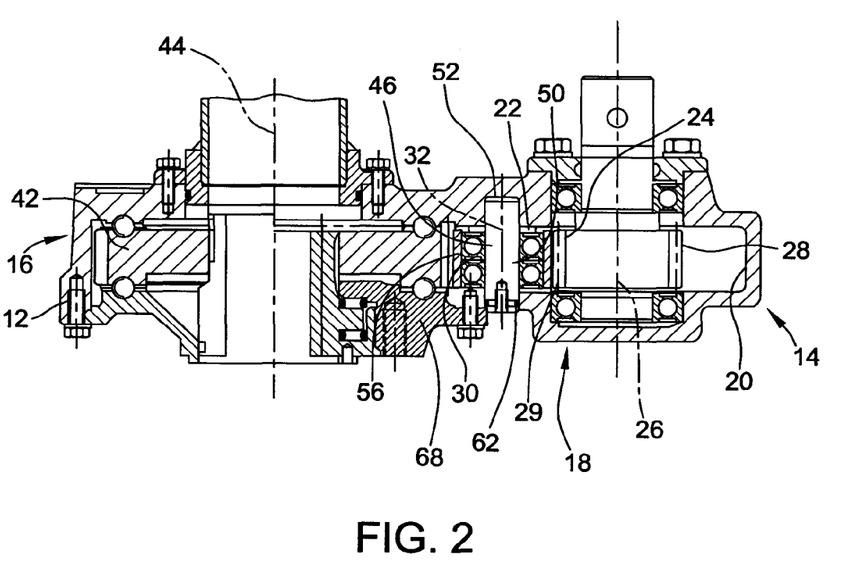
FIG. 2 is a sectional view taken on the line 2-2 of FIG. 1.

FIG. 2 is a sectional view taken on the line 2-2 of FIG. 1. As shown in FIG. 2, a first assembly generally designated 18 includes the first portion 14 of the housing 12 which defines a first enclosure 20 and a second enclosure 22, a first gearwheel 24 rotatably disposed within the first enclosure 20 about a first axis of rotation 26, the first gearwheel 24 defining a plurality of gear teeth 28 and 29 and a second gearwheel 30 rotatably disposed within the second enclosure 22 about a second axis of rotation 32 such that the plurality of gear teeth 28-29 intermesh with the second gearwheel 30.

Figure 3:
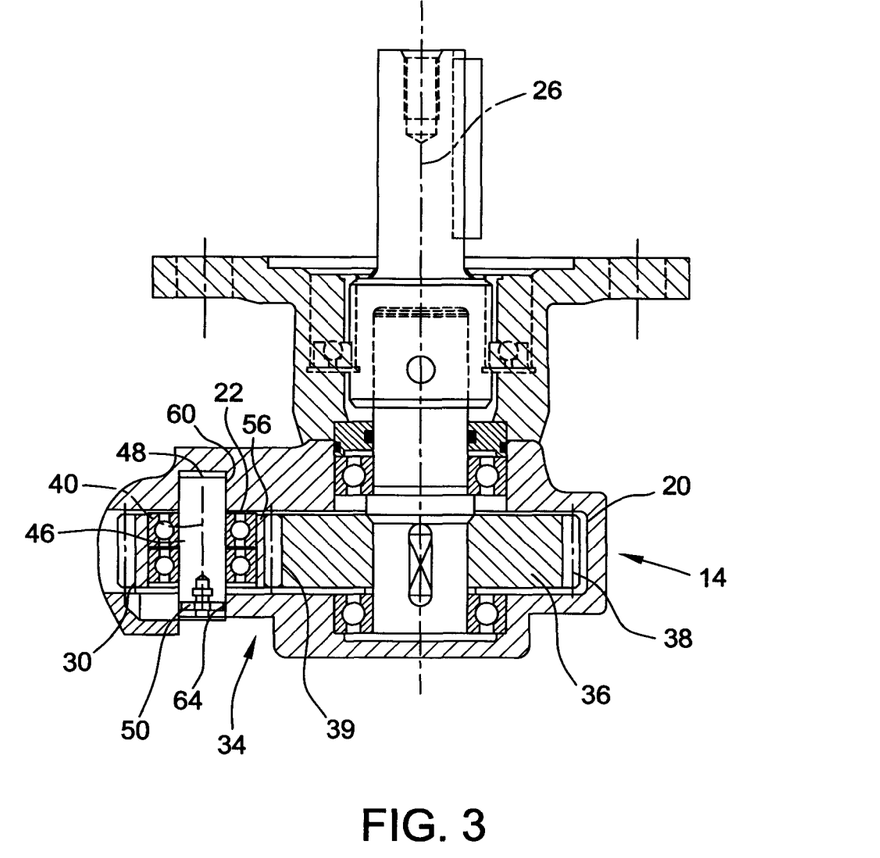
FIG. 3 is a view taken on the line 3-3 of FIG. 1 when the first assembly is replaced by a second assembly.

FIG. 3 is a view taken on the line 3-3 of FIG. 1 when the first assembly 18 is replaced by a second assembly generally designated 34. As shown in FIG. 3, the second assembly 34 is selectively interchangeable with the first assembly 18. The second assembly 34 includes the first portion 14, a further first gearwheel rotatably 36 disposed within the first enclosure 20 about the first axis of rotation 26, the first enclosure 20 being of sufficient capacity to selectively accommodate either of the first gearwheel 24 and further first gearwheel 36. The further first gearwheel 36 defines a further plurality of gear teeth 38, 39, the further plurality of gear teeth 38-39 being different in number from the plurality of gear teeth 28-29 of the first gearwheel 24. The second gearwheel 30 is rotatably disposed within the second enclosure 22 about a further second axis of rotation 40. As shown in FIG. 1, the further second axis of rotation 40 of the second gearwheel 30 is spaced from the second axis of rotation 32 of the second gearwheel 30 of the first assembly 18. The arrangement is such that the further plurality of gear teeth 38-39 of the further first gearwheel 36 intermesh with the second gearwheel 30.

As shown in FIG. 2, a third gearwheel 42 is rotatably disposed within the second portion 16 of the housing 12 for rotation about a third axis of rotation 44. The first, second, further second and third axes of rotation 26, 32, 40 and 44 respectively are disposed spaced and parallel relative to each other so that the third gearwheel 42 intermeshes with the second gearwheel 30 for generating a first gear ratio between the first and third gearwheels 24 and 42 respectively. As shown in FIG. 2, when the first assembly 18 is selectively replaced by the second assembly 34 shown in FIG. 3, a second gear ratio is generated between the further first gearwheel 36 and the third gearwheel 42.

In a more specific embodiment of the present invention, the housing 12 is fabricated from metal.

Furthermore, the first portion 14 is a casting and more specifically, the second portion 16 together with the first portion 14 is a one piece casting.

The first enclosure 20 permits a selective reception therein of the first gearwheel 24 and the further first gearwheel 36.

Also, as shown in FIGS. 2 and 3, the second gearwheel 30 includes a support pin 46 having a first and a second end 48 and 50 respectively. As shown in FIGS. 1 and 2, the pin 46 registers with a first hole 52 defined by the first portion 14 of the housing 12 when the pin 46 is disposed in a first location in which the gearbox apparatus is in a first mode of operation for generating the first gear ration.

Figure 4:
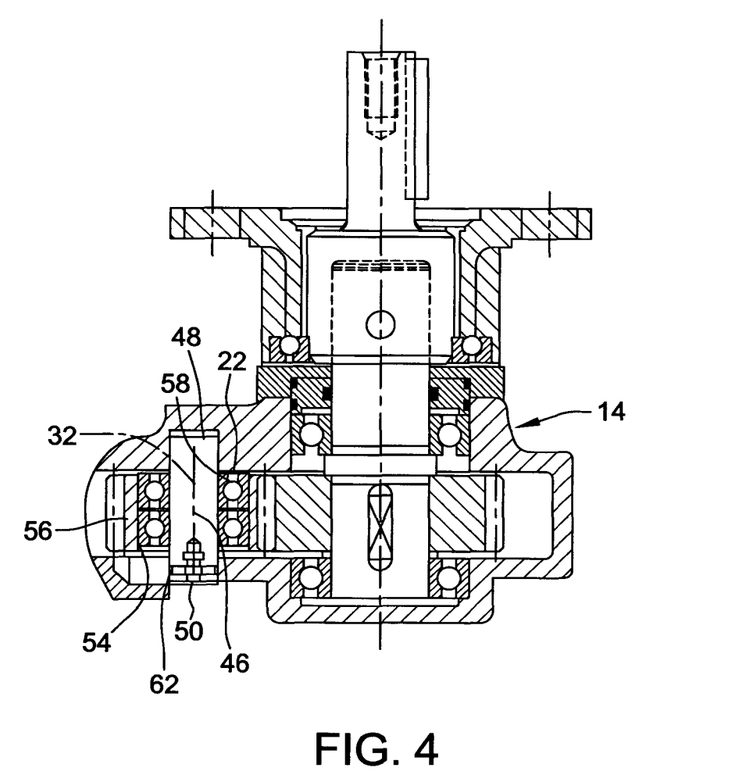
FIG. 4 is a sectional view taken on the line 4-4 of FIG. 1.

FIG. 4 is a sectional view taken on the line 4-4 of FIG. 1. As shown in FIG. 4, the pin 46 is disposed in the first location for generating the first gear ratio. A bearing 54 is disposed concentrically about the pin 46 and a gear 56 defines a cylindrical cavity 58 for the reception therein of the bearing 54. The arrangement is such that the gear 56 is bearingly supported by the pin 46 for rotation of the gear 56 about the second axis of rotation 32 within the second enclosure 22.

As shown in FIG. 3, in a second mode of operation for generating a second gear ratio, the pin 46 is selectively movable so as to register with a second hole 60 which is defined by the first portion 14 of the housing 12 when the gearbox apparatus 10 is in the second mode of operation. In the second mode of operation, the gearbox apparatus 10 generates the second gear ratio. The arrangement is such that the gear 56 is bearingly supported by the pin 46 for rotation thereof about the further second axis of rotation 40 within the second enclosure 22. The second hole 60 is spaced from the first hole 52 such that the second axis of rotation 32 is disposed at a first radial distance RD1, as shown in FIG. 1, from the first axis of rotation 26 so that the plurality of gear teeth 28-29 of the first gearwheel 24 intermesh with the gear 56 of the second gearwheel 30 when in the first mode of operation.

Furthermore, the arrangement is such that the further second axis of rotation 40 is disposed at a second radial distance RD2 from the first axis of rotation 26 as shown in FIG. 1 so that the further plurality of gear teeth 38-39 intermesh with the gear 56 of the second gearwheel 30 when in the second mode of operation.

In a preferred embodiment of the present invention, the pin 46 is of cylindrical configuration and the first hole 52 is of cylindrical configuration for the removable reception therein of the first end 48 of the pin 46 as shown in FIG. 3.

As shown in FIG. 2, a further first hole 62 is defined by the first portion 14 of the housing 12. The further first hole 62 is aligned relative to the first hole 52 for the removable reception therein of the second end 50 of the pin 46. The arrangement is such that in the first mode of operation of the gearbox apparatus 10 as shown in FIG. 2, the gear 56 is rotatably supported by the pin 46 for rotation thereof about the second axis of rotation 32, the gear 56 and the bearing 54 being disposed between the first hole 52 and the further first hole 62.

Also, as shown in FIG. 3, the second hole 60 is of cylindrical configuration for the removable reception therein of the first end 48 of the pin 46;

A further second hole 64 is defined by the first portion 14 of the housing 12. The further second hole 64 is aligned relative to the second hole 60 for the removable reception therein of the second end 50 of the pin 46. The arrangement is such that, in the second mode of operation of the gearbox apparatus 10, the gear 56 is rotatably supported by the pin 46 for rotation thereof about the further second axis of rotation 40, the gear 56 and the bearing 54 being disposed between the second hole 60 and the further second hole 64.

Moreover, as shown in FIG. 1, the second axis of rotation 32 and the further second axis of rotation 40 are disposed at a same radial distance RD from the third axis of rotation 44 such that the gear 56 intermeshes with the third gearwheel 42 when the gearbox apparatus 10 is disposed in the first and second modes of operation thereof.

The housing 12 defines additional holes such as 66 with each additional hole 66 being disposed at the same radial distance RD from the third axis of rotation 44.

Also, additional first gearwheels (not shown) are provided with each additional first gearwheel having a different number of gear teeth for generating addition gear ratios when the pin 46 is located in a corresponding hole of the additional holes 66.

Furthermore, as shown in FIG. 2, the second portion 16 of the housing 12 includes a removable cover 68. The arrangement is such that when the removable cover 68 is removed from the housing 12, access to the third gearwheel 42 and to the pin 46 is permitted so that movement of the pin 46 between the first and second holes 52 and 60 respectively is permitted.

In one embodiment of the present invention, the first portion 14 is releasably secured to the second portion 16.

Also, additional assemblies are provided in which each additional assembly includes an additional first portion 14, an additional first gearwheel 24 and an additional second gear wheel 30. The arrangement is configured such that the additional assemblies are selectively secured to the second portion 16 of the housing 12 after removal therefrom of the first assembly 18. By this arrangement, additional gear ratios are provided by the combination of the second portion 16 of the housing 12 which includes the third gearwheel 42 with one of the additional assemblies which have been preassembled ready for rapid generation of a different gear ratio.

In operation of the gearbox apparatus 10 according to the present invention, when a different gear ratio is required, the first gearwheel 24 is replaced by a replacement further first gearwheel 36 having a number of gear teeth thereon that will generate the required gear ratio. The pin 46 rotatably supporting the gear 56 will then be moved and located in the corresponding second hole 60 and location so that all of the gearwheels 36, 30 and 42 intermesh and cooperate together to generate the required gear ratio.

The present invention provides a unique gearbox apparatus having a one size first enclosure for selectively accommodating several gearwheels having different numbers of gear teeth for generating a required gear ratio and then moving the location of the second gearwheel so that the second gearwheel intermeshes with both the third gearwheel and the replacement further first gearwheel.

What I claim is:

1. A gearbox apparatus, said apparatus comprising:
   a housing which includes:
      a first portion defining a first hole and a second hole; and
      a second portion disposed adjacent to said first portion;
   a first assembly including:
      said first portion which defines a first enclosure and a second enclosure;
      a first gearwheel rotatably disposed within said first enclosure about a first axis of rotation, said first gearwheel defining a plurality of gear teeth; and
      a second gearwheel rotatably disposed within said second enclosure about a second axis of rotation extending through the first hole such that said plurality of gear teeth intermesh with said second gearwheel;
   a second assembly selectively interchangeable with said first assembly, said second assembly including:
      said first portion;
      a further first gearwheel rotatably disposed within said first enclosure about said first axis of rotation, said first enclosure being of sufficient capacity to selectively accommodate either of said first and further first gearwheels, said further first gearwheel defining a further plurality of gear teeth, said further plurality of gear teeth being different in number from said plurality of gear teeth of said first gearwheel;
      said second gearwheel rotatably disposed within said second enclosure about a further second axis of rotation extending through the second hole, said further second axis of rotation of said second gearwheel being spaced from said second axis of rotation of said second gearwheel such that said further plurality of gear teeth of said further first gearwheel intermesh with said second gearwheel; and
      a third gearwheel rotatably disposed within said second portion of said housing for rotation about a third axis of rotation, said first, second, further second and third axes of rotation being disposed spaced and parallel relative to each other so that said third gearwheel intermeshes with said second gearwheel for generating a first gear ratio between said first and third gearwheels and when said first assembly is selectively replaced by said second assembly, a second gear ratio is generated between said further first gearwheel and said third gearwheel.

2. A gearbox apparatus as set forth in claim 1 wherein said housing is fabricated from metal.

3. A gearbox apparatus as set forth in claim 1 wherein said first portion is a casting.

4. A gearbox apparatus as set forth in claim 1 wherein said second portion together with said first portion is a one piece casting.

5. A gearbox apparatus as set forth in claim 1 wherein said first enclosure permits a selective reception therein of said first gearwheel and said further first gearwheel.

6. A gearbox apparatus as set forth in claim 1 wherein said second gearwheel includes:
   a support pin having a first and a second end, said pin registering with the first hole defined by said first portion of said housing when said pin is disposed in a first location in which the gearbox is in a first mode of operation for generating said first gear ration;
   a bearing disposed concentrically about said pin;
   a gear defining a cylindrical cavity for the reception therein of said bearing such that said gear is bearingly supported by said pin for rotation of said gear about said second axis of rotation within said second enclosure when said gearbox apparatus is in a first mode of operation for generating a first gear ratio;
   said pin registering with the second hole defined by said first portion of said housing when the gearbox is in a second mode of operation for generating said second gear ratio, such that said gear is bearingly supported by said pin for rotation thereof about said further second axis of rotation within said second enclosure, said second hole being spaced from said first hole such that said second axis of rotation is disposed at a first radial distance from said first axis of rotation so that said plurality of gear teeth intermesh with said gear of said second gearwheel when in said first mode of operation and such that said further second axis of rotation is disposed at a second radial distance from said first axis of rotation so that said further plurality of gear teeth intermesh with said gear of said second gearwheel when in said second mode of operation.

7. A gearbox apparatus as set forth in claim 6 wherein said pin is of cylindrical configuration and said first hole is of cylindrical configuration for the removable reception therein of said first end of said pin, said first portion of said housing defining a further first hole, said further first hole being aligned relative to said first hole for the removable reception therein of said second end of said pin such that in said first mode of operation of the gearbox, said gear is rotatably supported by said pin for rotation thereof about said second axis of rotation, said gear and said bearing being disposed between said first hole and said further first hole.

8. A gearbox apparatus as set forth in claim 7 wherein said second hole is of cylindrical configuration for the removable reception therein of said first end of said pin, said first portion of said housing defining a further second hole, said further second hole being aligned relative to said second hole for the removable reception therein of said second end of said pin such that in said second mode of operation of the gearbox, said gear is rotatably supported by said pin for rotation thereof about said further second axis of rotation, said gear and said bearing being disposed between said second hole and said further second hole.

9. A gearbox apparatus as set forth in claim 8 wherein said second axis of rotation and said further second axis of rotation are disposed at a same radial distance from said third axis of rotation such that said gear intermeshes with said third gearwheel when the gearbox is disposed in said first and second mode of operation.

10. A gearbox apparatus as set forth in claim 9 wherein said housing defines additional holes with each additional hole disposed at said same radial distance from said third axis of rotation said gearbox apparatus further comprising additional first gearwheels, each additional first gearwheel having a different number of gear teeth for generating additional gear ratios when said pin is located in a corresponding hole of said additional holes.

11. A gearbox apparatus as set forth in claim 10 wherein said second portion of said housing includes:
   a removable cover such that when said removable cover is removed from said housing, access to said third gearwheel and to said pin is permitted so that movement of said pin between said first and second holes is permitted.

12. A gearbox apparatus as set forth in claim 1 wherein said first portion is releasably secured to said second portion, said gearbox apparatus further comprising additional assemblies which include:
   an additional first portion configured to releasably secure to said second portion of said housing after removal therefrom of said first portion;
   an additional first gearwheel;
   an additional second gearwheel for generating additional gear ratios.

13. A gearbox apparatus, said apparatus comprising:
   a housing which includes:
      a first portion defining a first hole and a second hole; and
      a second portion disposed adjacent to said first portion;
   a first assembly including:
      said first portion which defines a first enclosure and a second enclosure;
      a first gearwheel rotatably disposed within said first enclosure about a first axis of rotation extending through the first hole, said first gearwheel defining a plurality of gear teeth; and
      a second gearwheel rotatably disposed within said second enclosure about a second axis of rotation such that said plurality of gear teeth intermesh with said second gearwheel;
   a second assembly selectively interchangeable with said first assembly, said second assembly including:
      said first portion;
      a further first gearwheel rotatably disposed within said first enclosure about said first axis of rotation, said first enclosure being of sufficient capacity to selectively accommodate either of said first and further first gearwheels, said further first gearwheel defining a further plurality of gear teeth, said further plurality of gear teeth being different in number from said plurality of gear teeth of said first gearwheel; and
      said second gearwheel rotatably disposed within said second enclosure about a further second axis of rotation extending through the second hole, said further second axis of rotation of said second gearwheel being spaced from said second axis of rotation of said second gearwheel such that said further plurality of gear teeth of said further first gearwheel intermesh with said second gearwheel;
   a third gearwheel rotatably disposed within said second portion of said housing for rotation about a third axis of rotation, said first, second, further second and third axes of rotation being disposed spaced and parallel relative to each other so that said third gearwheel intermeshes with said second gearwheel for generating a first gear ratio between said first and third gearwheels and when said first assembly is selectively replaced by said second assembly, a second gear ratio is generated between said further first gearwheel and said third gearwheel; and
   said first enclosure permitting a selective reception therein of said first gearwheel and said further first gearwheel.

14. A gearbox apparatus, said apparatus comprising:
   a housing which includes:
      a first portion; and
      a second portion disposed adjacent to said first portion;
   a first assembly including:
      said first portion which defines a first enclosure and a second enclosure;
      a first gearwheel rotatably disposed within said first enclosure about a first axis of rotation, said first gearwheel defining a plurality of gear teeth; and
      a second gearwheel rotatably disposed within said second enclosure about a second axis of rotation such that said plurality of gear teeth intermesh with said second gearwheel;
   a second assembly selectively interchangeable with said first assembly, said second assembly including:
      said first portion;
      a further first gearwheel rotatably disposed within said first enclosure about said first axis of rotation, said first enclosure being of sufficient capacity to selectively accommodate either of said first and further first gearwheels, said further first gearwheel defining a further plurality of gear teeth, said further plurality of gear teeth being different in number from said plurality of gear teeth of said first gearwheel; and
      said second gearwheel rotatably disposed within said second enclosure about a further second axis of rotation, said further second axis of rotation of said second gearwheel being spaced from said second axis of rotation of said second gearwheel such that said further plurality of gear teeth of said further first gearwheel intermesh with said second gearwheel;
   a third gearwheel rotatably disposed within said second portion of said housing for rotation about a third axis of rotation, said first, second, further second and third axes of rotation being disposed spaced and parallel relative to each other so that said third gearwheel intermeshes with said second gearwheel for generating a first gear ratio between said first and third gearwheels and when said first assembly is selectively replaced by said second assembly, a second gear ratio is generated between said further first gearwheel and said third gearwheel;
   said housing being fabricated from metal;
   said first portion being a casting;
   said second portion together with said first portion being a one piece casting;
   said first enclosure permitting a selective reception therein of said first gearwheel and said further first gearwheel;
   said second gearwheel including:
      a support pin having a first and a second end, said pin registering with a first hole defined by said first portion of said housing when said pin is disposed in a first location in which the gearbox is in a first mode of operation for generating said first gear ratio;
      a bearing disposed concentrically about said pin; and
      a gear defining a cylindrical cavity for the reception therein of said bearing such that said gear is bearingly supported by said pin for rotation of said gear about said second axis of rotation within said second enclosure;

said pin registering with a second hole defined by said first portion of said housing when the gearbox is in a second mode of operation for generating said second gear ratio, such that said gear is bearingly supported by said pin for rotation thereof about said further second axis of rotation within said second enclosure, said second hole being spaced from said first hole such that said second axis of rotation is disposed at a first radial distance from said first axis of rotation so that said plurality of gear teeth intermesh with said gear of said second gearwheel when in said first mode of operation and such that said further second axis of rotation is disposed at a second radial distance from said first axis of rotation so that said further plurality of gear teeth intermesh with said gear of said second gearwheel when in said second mode of operation;

said pin being of cylindrical configuration;

said first hole being of cylindrical configuration for the removable reception therein of said first end of said pin;

a further first hole defined by said first portion of said housing, said further first hole being aligned relative to said first hole for the removable reception therein of said second end of said pin such that in said first mode of operation of the gearbox apparatus said gear is rotatably supported by said pin for rotation thereof about said second axis of rotation, said gear and said bearing being disposed between said first hole and said further first hole;

said second hole being of cylindrical configuration for the removable reception therein of said first end of said pin;

a further second hole defined by said first portion of said housing, said further second hole being aligned relative to said second hole for the removable reception therein of said second end of said pin such that in said second mode of operation of the gearbox, said gear is rotatably supported by said pin for rotation thereof about said further second axis of rotation, said gear and said bearing being disposed between said second hole and said further second hole; and said second axis of rotation and said further second axis of rotation being disposed at a same radial distance from said third axis of rotation such that said gear intermeshes with said third gearwheel when the gearbox is disposed in said first and second modes of operation.

* * * * *